United States Patent [19]

Nashner et al.

[11] Patent Number: 5,697,791
[45] Date of Patent: Dec. 16, 1997

[54] APPARATUS AND METHOD FOR ASSESSMENT AND BIOFEEDBACK TRAINING OF BODY COORDINATION SKILLS CRITICAL AND BALL-STRIKE POWER AND ACCURACY DURING ATHLETIC ACTIVITITES

[76] Inventors: Lewis M. Nashner, 4011 Coho La., Lake Oswego, Oreg. 97034; Daniel F. Goldstein, 1896 Palm Beach Lakes Blvd., West Palm Beach, Fla. 33409

[21] Appl. No.: 407,232

[22] Filed: Mar. 21, 1995

Related U.S. Application Data

[63] Continuation-in-part of Ser. No. 346,007, Nov. 29, 1994, abandoned.

[51] Int. Cl.[6] .................. A63B 69/00; G09B 9/00; G09B 19/00
[52] U.S. Cl. .................. 434/247; 434/248; 434/249; 434/250; 434/251; 434/252; 434/253; 434/254; 434/255; 434/258; 273/1.5 A; 273/26 R; 273/29 A; 273/35 R; 273/183.1; 273/184 R; 273/187 R; 273/187.2; 273/186.1; 273/186.4; 482/902
[58] Field of Search .................. 434/247-252

[56] References Cited

U.S. PATENT DOCUMENTS

| | | | |
|---|---|---|---|
| 2,043,187 | 6/1936 | Owens | 128/2 |
| 2,095,268 | 10/1937 | Roberts | 73/51 |
| 3,420,222 | 1/1969 | Noe et al. | 128/2 |
| 3,850,034 | 11/1974 | Tsuchiya et al. | 73/172 |
| 3,906,931 | 9/1975 | Terekhov | 128/2 |
| 3,974,491 | 8/1976 | Sipe | 340/573 |
| 4,014,398 | 3/1977 | Gresko | 177/208 |
| 4,122,840 | 10/1978 | Tsuchiya et al. | 128/2 S |
| 4,136,682 | 1/1979 | Pedotti | 128/2 S |
| 4,195,643 | 4/1980 | Pratt, Jr. | 128/779 |
| 4,267,728 | 5/1981 | Manley et al. | 73/172 |
| 4,416,293 | 11/1983 | Anderson et al. | 128/782 |
| 4,503,705 | 3/1985 | Polchaninoff | 73/172 |
| 4,598,717 | 7/1986 | Pedotti | 128/779 |
| 4,644,801 | 2/1987 | Kustanovich | 73/172 |
| 4,763,284 | 8/1988 | Carlin | 364/550 |
| 4,813,436 | 3/1989 | Au | 128/779 |
| 4,813,665 | 3/1989 | Carr | 272/75 |
| 4,830,021 | 5/1989 | Thornton | 128/707 |
| 4,927,138 | 5/1990 | Ferrari | 272/70 |

(List continued on next page.)

FOREIGN PATENT DOCUMENTS

| | | | |
|---|---|---|---|
| 0278150 A2 | 8/1988 | European Pat. Off. | A63B 69/00 |
| 2619702 | 3/1989 | France . | |
| 2072519A | 10/1981 | United Kingdom | A63B 69/36 |
| WO 89/11246 | 11/1989 | WIPO . | |
| WO 93/06779 | 4/1993 | WIPO . | |

OTHER PUBLICATIONS

Oxford Medical Systems, "Vicon," brochure, date unknown.
Infotronic, "CDG—Computer Dyno Graphy," brochure, date unknown.

(List continued on next page.)

*Primary Examiner*—Richard J. Apley
*Assistant Examiner*—John Rovnak
*Attorney, Agent, or Firm*—Bromberg & Sunstein LLP

[57] ABSTRACT

Devices and methods for the assessment and biofeedback training of coordination skills of a subject critical to maximizing the power and accuracy of athletic ball-strike activities. In preferred embodiments, the invention provides for assessment and biofeedback training of weight bearing and center of gravity control under conditions requiring the athlete to strike a ball such that the distance and direction of flight trajectory of the ball are accurate relative to a performance goal. One embodiment of the invention includes a body movement sensor, a ball strike sensor, a display, and a computer. The body movement sensor provides an output indicative of the motion of the subject's body over a period of time including the moment of ball strike. The computer causes the display to show both a trajectory of the motion of the subject's body and the moment of ball strike in relation to a region of the trajectory.

19 Claims, 8 Drawing Sheets

U.S. PATENT DOCUMENTS

| | | | |
|---|---|---|---|
| 4,941,660 | 7/1990 | Winn et al. | 272/76 |
| 5,118,112 | 6/1992 | Bregman et al. | 273/183 A |
| 5,150,902 | 9/1992 | Heisler | 273/186.1 |
| 5,299,454 | 4/1994 | Fuglewicz et al. | 73/172 |
| 5,419,562 | 5/1995 | Cromarty | 273/183.1 |
| 5,476,103 | 12/1995 | Nashner | 128/782 |

OTHER PUBLICATIONS

Motion Analysis Corp., "The ExpertVision System," brochure, date unknown.

NeuroCom International, "Balance Master & Balance Master Trainer," brochure (1990).

Kistle Instrument Corp., "Gaitway; Instrumented Treadmill System for Multiple Foot Strike Force Requirements," brochure (1994).

Article (Paxson T. 1994. Is Your Swing In Balance? *Golf Digest*. Jan. 135–138).

Kram., "A Treadmill–mounted Force Platform," Abstract #295, XII International Congress of Biomechanics, Congress Proceedings, University of California, Los Angeles, 26–30 Jun. 1989.

Kram et al., "A Treadmill–mounted Force Platform," American Physiological Society, Journal of Applied Physiology, 67(4):1692–1698 (1989).

Hamman, R.G., et al., "Training Effects During Repeated Therapy Sessions of Balance Training Using Visual Feedback," *Archives of Physical Medicine and Rehabilitation*, 73: 738–744(1992).

Nashner, L.M., "Sensory Feedback in Human Posture Control," Sc.D. Thesis, Man–Vehicle Laboratory, Center for Space Research, Massachusetts Institute of Technology, Cambridge, MA 02139 (1970).

APPARATUS AND METHOD FOR ASSESSMENT AND BIOFEEDBACK TRAINING OF BODY COORDINATION SKILLS CRITICAL AND BALL-STRIKE POWER AND ACCURACY DURING ATHLETIC ACTIVITITES

This application is a continuation in part of U.S. application Ser. No. 08/346,007, filed Nov. 29, 1994, titled "Apparatus and Method for Assessment and Biofeedback Training of Body Coordination Skills Critical to Ball-Strike Power and Accuracy During Athletic Activities, now abandoned.

TECHNICAL FIELD

The invention relates to devices and methods for the assessment and biofeedback training of body coordination skills critical to maximizing the power and accuracy of ball-strikes during athletic activities such as golf, tennis, baseball, soccer, and football.

BACKGROUND ART

A. Use of Forceplates in Determination of Body Position or Motion of a Standing Subject The design and use of forceplates to measure the forces exerted by the feet of a standing subject and the relations between these forces and the subject's center of gravity are well described in the prior art. Examples of these prior art descriptions include: (Nashner LM. 1970. *Sensory Feedback in Human Posture Control*. Massachusetts Institute of Technology Report MVT-70-3), (Black F O et al. 1978. Computerized screening of the human vestibulospinal system. *Annals of Otology Rhinology and Laryngology* 87: 783–789.). U.S. Pat. No. 4,136,682 to Pedotti describes a forceplate system on which a standing subjects walks, and also includes methods for processing the resulting information relative to the motions of the subject.

The center of gravity path of a standing subject is typically characterized in terms of quantities related to the position of the center of force exerted by the feet against the support surface relative to the positions of the feet on the surface. The magnitude and the position of the center of force exerted by a subject standing on a single forceplate is determined in the coordinates of the forceplate support surface.

To calculate quantities related to the subject's center of gravity requires knowledge of the positions of the two feet relative to the forceplate. In addition, the calculation requires knowledge of the dynamic relations (amplitude and phase as functions of frequency) between the center of force and center of gravity quantities. One method described in the prior art for calculating quantities related to center of gravity from quantities related to center of force of a standing subject uses a multiple pole filter, the characteristic frequencies of which are set to approximately match the dynamic relations between the center of force and the center of gravity quantities (*EquiTest Operators Manual*, NeuroCom International, Inc., Clackamas, Oreg.).

B. Biofeedback Training of Sway Control During Erect Standing

The earliest known application of a device and method for biofeedback training of erect standing was reported in 1967 (Begbie C H. 1967. Some problems of postural sway. In: deReuck A V S, Knight J, eds. *CIBA Foundation Symposium on Myotatic, Kinesthetic, and Vestibular Mechanisms*. London, Churchill Ltd, 80–101).

The Begbie study used a compliant platform to monitor postural sway during erect standing. When the standing subject swayed forward, backward, or to one side, the resultant reaction forces between the feet and the platform support surface deflected the surface in the direction of the subject's sway. Deflection was measured using a potentiometer, the output of which provided a signal related to the direction and extent of the subject's sway. Applications for the measurement and biofeedback device described by Begbie, however, were limited to tasks in which the subject performed standing with the feet in fixed positions.

The Begbie report described a biofeedback application of the platform device in which an oscilloscope displayed two quantities to the subject. The first quantity displayed the deflection of the platform, allowing the subject to see the direction and extent of his own swaying. The second quantity was a target sway position providing the subject with a performance goal. The report described how the platform and biofeedback display system helped patients with vestibular balance disorders by allowing them to substantially reduce their otherwise abnormal postural sway.

The description of a device and method for training a standing subject to modify the distribution of weight load between the two legs was described in 1973 (Herman R. 1973. Augmented sensory feedback in the control of limb movement. In: Fields W S (ed). *Neural Organization and Its Relevance to Prosthetics*. Miami, Symposia Specialists, 197–215).

U.S. Pat. No. 4,122,840 by Kazuo Tsuchiya and Noboru Ohnishi, both of Japan, entitled "Apparatus for Analyzing the Balancing Function of the Human Body" has a foreign application priority date of Jun. 1, 1976. This patent describes a device and methods using biofeedback to train the distribution of loads between the two legs of a standing subject. The device consists of independent vertical load detectors to measure the distribution of loads on the legs and an array of light emitting diodes to visually display actual loads relative to a specified target load signal. With the exception of minor differences in force measuring and display technology, the measurement and biofeedback methods were very similar to those described earlier by Begbie and Herman.

C. Other Technologies for Measuring Body Movement

A number of technologies in addition to force-sensing surfaces are known for calculating and displaying quantities related to body motions while an erect standing subject executes a movement task. Several manufacturers market computer-video based motion analysis systems which measure movements of targets placed at selected points on the subject's body. These systems do not require that the feet be positioned on a force sensing surface.

Two examples of computer-video motion analysis systems include the ExpertVision system by MotionAnalysis Corp., Santa Rosa, Calif. and the Vicon system by Oxford Medilog Systems Limited, Oxfordshire, England. Computer based video motion systems have been used in the prior art to track the motions of individual body segments during sports activities. Video motion analysis systems have also been used in the prior art to calculate quantities related to motions of a subject's body center of gravity during a sport activity. In accordance with prior art methods, motions of the body COG are calculated by determining the mass and center of gravity position of each body segment, determining the motions of each body segment using video motion analysis, and then calculating the total body center of gravity based on the known masses and positions of the individual segments.

Video motion analysis systems have also been used in the prior art to track the motions of hand-held devices such as bats, clubs, rackets during sports activities.

It is also known to provide a shoe instrumented with force sensing devices. An example of such a system is the Computer Dyno Graph (CDG) marketed by Infotronic Medical Engineering of Tubbergan, The Netherlands. For routine clinical use, this type of system also has the disadvantage of also requiring body mounted hardware and calibration. In addition, since these devices do not include means for determining the positions of the force sensing shoes on a continuous basis, they cannot be readily used to determine the position of the subject on a continuous basis.

D. Clinical Applications of Biofeedback Stance and Movement Training

A number of published research reports have described clinical applications for training devices in accordance with the original concepts described by Begbie and Herman. Balance training was used to achieve symmetrical standing in stroke patients (Wannstedt G T, Herman R M. 1978. Use of augmented sensory feedback to achieve symmetrical standing. *Physical Therapy* 58: 553–559). Similar devices were used to train children with cerebral palsy (Seeger B R, Caudrey D J. 1983. Biofeedback therapy to achieve symmetrical gait in children with hemiplegic cerebral palsy. *Archives of Physical Medicine and Rehabilitation* 64: 160–162). Two additional studies used balance biofeedback therapy to reestablish the stability of stance and gait in hemiplegic patients (Shumway-Cook A, Anson D, Haller S. 1988. Postural sway biofeedback: its effect on reestablishing stance stability in hemiplegic patients. *Archives of Physical Medicine and Rehabilitation* 69: 395–400) and (Winstein C J, Gardner E R, McNeal D R, Barto PS, Nicholson D E. 1989. Standing balance training: effect on balance and locomotion in hemiplegic adults. *Archives of Physical Medicine and Rehabilitation* 70: 755–762). Additional studies using biofeedback training in standing patients include: (1) Clarke A H, Krzok W, Scherer H. 1990. Posturography with sensory feedback—a useful approach to vestibular training? In: Brandt T, Paulus W, Bles W, Dietrich M, Krafcyk S, Straub A (eds). *Disorders of Posture and Gait*. Stuttgart: George Thieme Verlag: 281–284, (2) Jobst U. Patterns and strategies in posturographic biofeedback training. In: Brandt T, Paulus W, Bles W, Dietrich M, Krafcyk S, Straub A (eds). *Disorders of Posture and Gait*. Stuttgart: George Thieme Verlag: 277–300, (3) Hamann K F, Krausen C H. 1990. Clinical application of posturography: body tracking and biofeedback training. In: Brandt T, Paulus W, Bles W, Dietrich M, Krafcyk S, Straub A (eds). *Disorders of Posture and Gait*. Stuttgart: George Thieme Verlag: 295–298, and (4) Haman R G, Mekjavic I, Mallinson A I, Longridge N S. 1992. Training effects during repeated therapy sessions of balance training using visual feedback. *Archives of Physical Medicine and Rehabilitation* 73: 738–744.

E. Equipment for Center of Gravity Biofeedback Training

Several manufactures now market devices for the assessment and biofeedback training of weight bearing and center of gravity control while patients stand erect with the feet maintained in fixed positions on a support surface. In the United States for example, the Balancemaster system manufactured by NeuroCom International, Inc. of Clackamas Oreg. uses signals from a forceplate to calculate the position of the subject's body center of gravity over the feet. The center of gravity is displayed on a video monitor along with one or more target performance goals selected by the clinician. When operating in the training mode, the subject is instructed to shift body position to move the center of gravity curser into one or a sequence of several targets. In the assessment mode, the speed and accuracy with which the subject moves the center of gravity curser to targets are calculated and displayed.

The Balance System (Chattecx division of Chattanooga Corporation of Chattanooga, Tenn.) uses four vertical force measuring plates to determine the percentage of body weight carried by the front and back portions of each foot. The feedback display and training operations of the device are similar to the NeuroCom system in that a single target indicating the position of the body weight relative to the feet is displayed on a video monitor relative to additional targets.

The Balance Performance Monitor (BPM) is manufactured by SMS Healthcare, Essex CM19 5TL, England. The system consists of two force measuring footplates and a visual display. Each footplate measures total weight as well as the front-back distribution of the weight. The footplates are movable and can be placed at different locations or surfaces of different heights. The computational means, however, determines only the distribution of weight between the two footplates, independent of the positions of the two plates. Thus, the system does not include computational means to calculate and display quantities related to the balance of the subject under a variety of task conditions.

Advanced Mechanical Technology, Inc. (AMTI, Newton, Mass. 02158) manufactures forceplates and software technology used for assessment of center of force information during sports activities including the tennis serve. While the AMTI technology provides sophisticated information related to center of force during standing and walking tasks, no information is provided relative to the time of ball strike.

None of the clinical biofeedback devices in the present art include devices and methods for assessing and training quantities related to body motion in relation to pre-strike, ball-strike, and post-strike phases of the swing.

F. Importance of Weight Distribution Control For Maximizing Power and Accuracy of The Golf Swing The importance of weight distribution control in maximizing the accuracy of the golf swing is summarized by a recent article (Paxon T. 1994. Is Your Swing In Balance? *Golf Digest*: January 135–138). In this article, the author describes the importance of forward-backward weight control during the golf swing. Specifically, weight must be maintained evenly and consistently between the balls and heels of the feet during the entire swing. Rocking back on the heels or leaning forward on the balls of the feet during any phases of the swing disrupts balance. Once the balance is disrupted, the chances of hitting the ball with consistency from one swing to the next is reduced. The author of this article describes some simple subjective methods by which a player can assess his or her forward-backward balance during the golf swing.

The importance of coordinated weight transfer from the right to the left leg during the swing is emphasized in marketing literature for the WAVI (tm) System from Sports Technology, Inc. (12 Plains Road, Essex, Conn. 06426). The WAVI golf training system, according to the manufacturer, is a weight analysis video instrument consisting of two weight scales and a video display. During the swing, each foot rests on one weight scale, and the display charts trajectories of the weights carried by the left and right legs during the swing.

According to WAVI literature, a coordinated transfer of weight from the right foot during the golf swing is a key to such improvements such as greater drive strength. Some players hold their weight back on the right side during the swing, for example.

ASTAR (11722-D Sorrento Valley Road, San Diego, Calif. 92121-3425) manufactures a computer-video motion analysis system for analyzing a player's golf swing. This system records and displays visual images of the golfer's swings. Results analysis includes the capability to draw simple stick figures of the golfer's body and club motion trajectories during the golf swing. In addition, the system can display two separate swings at the same time so that the player can compare the results. The ASTAR system, however, provides no information relative to motions of the player's center of gravity or weight bearing during the golf swing.

G. Sensing the Time of Impact Between a Ball And a Ball-Striking Implement

When a ball-striking implement or a body member strikes a ball with force sufficient to cause the ball to travel a significant distance from its initial position, the ball and the ball-striking implement will undergo small deformations and vibrations beginning with the moment of the strike. In addition, the ball-strike will produce acoustic vibration signals. Many prior art technologies are available for sensing the deformations and vibrations associated with one object impacting another.

One method in the prior art for sensing the deformations and vibrations associated with one object impacting another is to attach strain gauges to the ball-striking means or to the ball. This method of ball-strike time sensing is appropriate when a hand-held object such as a golf club, racket, or bat is used to strike the ball. In accordance with this application, strain gauges attached to the ball-striking means sense the small fractions of a percent changes in surface lengths due to object bending at the time of impact. This is the same strain gauge technology used to measure forces exerted on a forceplate. When this method is used, time of impact is indicated by a brief period of bending within the structure of the ball and/or the ball-striking means.

A second prior art method for measuring the time of ball impact when a hand-held object is used is to mount a vibration sensing means on the hand-held strike object. In one method described in the prior art for creating a vibration sensor, a magnetized piece of metal is suspended within a coil of wire such that vibrations cause the metal to transiently move relative to the surrounding coil. Movements of the magnetic material within the wire coil caused by vibration of the device induce electrical currents within the wire in relation to the material movements.

A third prior art method for sensing ball impact time when the ball is struck with a member of the body and when the ball normally rests in a fixed position prior to ball-strike is to place the ball on a second force-sensing surface similar to that described for sensing motions of the body. Striking and moving the ball causes changes in the distribution of forces on the ball supporting surface.

A fourth prior art method for sensing ball impact time when the ball is struck by a member of the body and when the ball is normally in flight rather than fixed prior to ball-strike is to place a sound sensing microphone near the point where the ball will be struck. The time of ball impact will produce characteristic acoustic vibrations that can be sensed by the microphone.

Optical means provide a fifth prior art method of sensing the time of ball strike by a member of the body when the ball is in flight rather than in a fixed location to the time of the strike. The optical sensing means includes a light source (for example, a light emitting diode) and a light sensing device a photo (a photo transistor). Flight of the ball between the source and the sensor momentarily disrupts the transmission of light between the two, resulting in a measurable signal indicating ball flight past the light sensor.

H. Summary of Background Art

The use of force measuring surfaces to calculate the distribution of forces exerted by the feet relative to the base of support and the biofeedback display of these quantities to train aspects of weight bearing, center of gravity, and balance control during erect standing with the feet maintained in fixed positions is well established in the prior art. The prior art includes: (1) numerous studies demonstrating clinical applications for balance training with biofeedback and (2) several manufacturers with devices for the biofeedback training of standing in-place balance.

The prior art also includes methods and devices for measuring and displaying quantities related to weight distribution, balance, body segment, and club motions during a ball strike sports activity. As an alternative means to the forceplate, the prior art has described video motion analysis methods for measuring and displaying quantities related to the body center of gravity motions.

The Golf Digest article is limited to control of front-back balance during the swing, and describes no technological means for measuring or displaying physical quantities during a golf swing. The WAVI System from Sports Technology, Inc. provides a device for measuring and displaying information relative only to lateral weight bearing during the golf swing. No front-back information is provided. However, none of the prior art devices and methods provide for measuring and displaying information that effectively shows body movement in relation to the ball strike task itself or that would permit biofeedback training in this context.

SUMMARY OF THE INVENTION

The present invention includes devices and methods for the assessment and biofeedback training of coordination skills of a subject critical to maximizing the power and accuracy of athletic ball-strike activities. Such athletic activities include but are not limited to golf, tennis, racquetball, badminton, ping-pong, squash, hockey, baseball-batting, and soccer and football kicking. The invention is also applicable to activities such as basketball basket throws, lacrosse, and bowling where ball-release replaces ball-strike as a key point in time. As used in the following description "and the following claims, includes ball-release except where the context otherwise, requires the term "ball strike". In preferred embodiments, the invention provides for assessment and biofeedback training of weight bearing and center of gravity control under conditions requiring the athlete to strike a ball such that the distance and direction of flight trajectory of the ball are accurate relative to a performance goal.

A device in accordance with an embodiment of the invention is realized by the combination of a body movement sensor, a ball strike sensor, a display, and a computer. The body movement sensor provides an output indicative of the motion of the subject's body over a period of time including the moment of ball strike. The computer is in communication with the body movement sensor, the ball strike sensor, and the display, and causes the display to show both a trajectory of the motion of the subject's body and the moment of ball strike in relation to a region of the trajectory. A related method is also provided, involving the steps of (a) sensing the movement of the subject's body and providing an movement output indicative of the motion of the subject's body over a period of time including the moment of ball strike; (b) sensing ball-strike and providing a ball-strike output indicative of ball-strike; and (c) calculating and causing a display to show, on the basis of the movement output and the ball-strike output, both a trajectory of the motion of the subject's body and the moment of ball strike in relation to a region of the trajectory.

More generally, the invention provides a device for the assessment or biofeedback training of coordination skills of a subject in connection with a movement task the success of which is dependent upon the subject's motion at one or more critical phases of the task. Striking or throwing a ball may constitute one such movement task, in which the critical phase is ball-strike (including ball-release). However, other such tasks may include tackling a ball-runner in football, in which a critical phase is the moment of leaping to tackle; pole-vaulting, in which one of the critical phases is release of the pole; and springboard diving, in which a critical phase is release from the diving board. The device of this embodiment has a body movement sensor, providing an output indicative of the motion of the subject's body over a period of time. It also has a signal arrangement for providing a signal at onset of the critical phase and a display. A computer is also provided, in communication with the body movement sensor, the signal arrangement, and the display, to cause the display to show both a trajectory of the motion of the subject's body and the onset of the critical phase in relation to a region of the trajectory. The signal arrangement may be in the form of a specific sensor, such as a ball-strike sensor, or may be implemented heuristically by calculation from other available data. Related methods are also provided.

In a preferred embodiment, the motion of the subject's body is determined as motion of the subject's center of gravity, and the body movement sensor includes a forceplate. In a further preferred embodiment, the trajectory is determined in at least two dimensions—which may include, but need not be limited to, those lying in a horizontal plane. In a further embodiment, the trajectory and time of ball-strike are displayed in relation to a performance goal.

In further embodiments, the two-dimensional trajectory is displayed in left-right and front-back components. The display can be provided either in real time during actual performance of the ball-strike task, or as a performance review after completion of the task.

In a preferred embodiment of the invention, an athlete stands on a force sensing means, the support surface of which has markings to indicate preferred positions for the placement of the feet. The athlete grasps a ball-strike implement, on the body of which is mounted a ball-strike sensor, implemented as an impact sensor, for sensing impact deformations or vibrations associated with the time of ball-strike.

In the first preferred embodiment of the invention, a golfer stands on forceplate. An impact sensor is mounted on the golf club. The golf ball is placed on a surface. The forceplate is positioned in relation to the ball supporting surface such that the ball lies within the swing range of the player. The first preferred embodiment allows the system to be used in an actual playing environments such as a driving range or golf course, as well as in training environments designed to simulate actual playing environments. By placing the forceplate at different angles relative to the horizontal and by placing the surface supporting the ball at different orientations relative to the sensing plate, it is possible in the training environment to simulate playing environments in which the ball is lying in a sloping surface. When this embodiment is used in an actual playing environment, the golfer can compare the displayed results of the system with the actual flight of the ball.

In an alternative embodiment of the first preferred embodiment, the ball is placed on the surface and is also attached by a length of cord or wire to a rigid body which confines its flight path. With this alternative embodiment, the golfer can practice golf swings in a confined environment and receive biofeedback information relative to his center of gravity trajectory and the time of ball-strike. In another alternative embodiment of the first preferred embodiment, the time of ball-strike is sensed by placing the ball on an impact sensing surface. With this alternative, it is not necessary to mount an impact sensor on the golf club. In yet another alternative embodiment of the first preferred embodiment, the time of ball-strike is sensed by a sound sensor placed in the vicinity of the ball to detect the acoustic vibrations caused by the impact of the club on the ball.

In yet another alternative embodiment, an optical light source and a light sensor are placed in the vicinity of the ball such that the resting ball disrupts the light path from the source to the sensor. Ball strike is detected when movement of the ball allows the light to reach the sensor.

In a second preferred embodiment of the invention, an athlete stands on the sensing surface of a force plate and holds a ball-striking implement. A impact sensing means is mounted on the handle of the hand-held ball-striking implement. The player swings at an in-flight ball whose path lies within the player's swing range. This embodiment allows the system to be used by a tennis player or a baseball batter in actual playing environments such as a tennis court or baseball field. With this embodiment, the player can compare the displayed results of the system with the actual flight of the ball.

In an alternative embodiment of the second preferred embodiment, a ball is suspended in front of the athlete within the player's swing range by a length of cord or wire to a rigid body. With this embodiment, the player can practice striking the ball in confined environments and receive biofeedback information relative to his center of gravity trajectory and the time of ball-strike. In yet another alternative embodiment of the second preferred embodiment, the time of ball-strike is sensed by a sound sensor means placed in the vicinity of the player's swing range to detect the acoustic vibrations caused by the impact of the racket or bat on the ball.

In a third preferred embodiment of the invention, an athlete stands on a forceplate in a position appropriate for kicking a ball with a foot. A ball is placed on or sufficiently near the forceplate such that the ball is within the kicking range of the athlete. A sound sensor is placed in the vicinity of the ball to detect the acoustic vibrations caused by the impact of the athletes foot on the ball. With this embodiment, the player can practice in-place kicks in an actual playing environment, and the player can compare displayed results of the system to the actual flight of the ball.

In an alternative embodiment of the third preferred embodiment, the soccer or football is placed on a second surface such that the ball is within the kicking range of the player and is also attached by a length of cord or wire to a rigid body which confines its flight path. With this alternative embodiment, the player can practice kicks in a confined environment and receive biofeedback information relative to his center of gravity trajectory and the time of ball-strike.

In a fourth preferred embodiment of the invention, a soccer ball or football is placed on a second surface which is oriented relative to the forceplate such that the player can kick the ball while positioned on the forceplate. An impact sensor is placed in the surface supporting the ball. The two surfaces are placed on a larger surface area such that the player can walk or run onto the sensing surface of the force sensing means and kick the ball. With this preferred embodiment, the player can practice walking and running kicks in an actual playing environment, and the player can compare displayed results of the system to the actual flight of the ball.

In an alternative embodiment of the fourth preferred embodiment, the time of ball-strike is sensed by a sound sensor placed in the vicinity of the ball to detect the acoustic vibrations caused by the impact of the club on the ball. In yet another alternative embodiment of the fourth preferred embodiment, the soccer or football is placed on a second surface such that the ball is within the kicking range of the player and is also attached by a length of cord or wire to a rigid body which confines its flight path. With this alternative embodiment, the player can practice kicks in a confined environment and receive biofeedback information relative to his center of gravity trajectory and the time of ball-strike.

In all four of the above preferred embodiments of the invention, signals from the forceplate and the impact sensor are accepted by a computer. The computer calculates quantities related to the two-dimensional (left right and forward backward) position of the player's center of gravity and quantities related to the time of ball-strike, all of which are calculated over a period of time beginning before each ball-strike and ending a period of time after the ball-strike. The computer then generates a display which includes the two-dimensional trajectory of the player's center of gravity, a marker indicating the time of ball-strike on the center of gravity trajectory, and a performance goal for positions the center of gravity and ball-strike. The display is placed near enough to the player such that the player can view the display during and immediately after each ball-strike. Alternatively, the display is placed in a remote location and the player executes one or a sequence of ball-strikes and then subsequently reviews separate displays for each strike or a single display combining results of the sequence of ball-strikes.

In all four of the above preferred embodiments, the computer begins accepting signals and begins calculating quantities prior to the ball-strike. There are a number of alternative preferred embodiments of a start-time trigger to signal to the computer to begin data processing (i.e. accepting data as pertinent to a ball-strike trial). In the first preferred embodiment of a start-time trigger, the player signals the computer to begin a ball-strike trial. In this preferred embodiment, the start-time trigger may be a manual signaling device, including but is not limited to, a hand-held button, a keyboard strike, or a voice-actuated triggering device. In a second preferred embodiment of a start-time trigger to be used with preferred embodiments of the invention in which the player swings at an in-flight ball, the start-time trigger to begin data processing coincides with the time the ball is thrown. If the ball is thrown by an individual, that individual can signal the computer by means similar to the manual signalling devices described previously. If the ball is thrown by a machine, the machine can be modified to transmit a start signal to the computer. In a third preferred embodiment of the start-time trigger, the computer calculates the time to begin a trial. Criteria for calculation of a start-time include but are not limited to a random time within a defined interval following the completion of the last trial. If this alternative is used, the computer may be programmed to generate a visual or auditory start signal to the player by means including but not limited to the display, illumination of a light, or triggering a sound generator. In a fourth preferred embodiment of the start-time trigger, the computer calculates the time to begin a trial based on signals from the forceplate. Criteria for calculation of a start-time based on signals from the forceplate include but are not limited to a time when the player begins to shift the center of gravity away from an initial position such that a specified positional criterion is exceeded.

In all four of the above preferred embodiments, the computer continues calculations for a defined post-strike time interval after the ball has been struck. Characteristics of the specific sport activity can be used to establish the length of the post-strike time interval. In one preferred embodiment of the post-strike time interval based on characteristics of the sport activity, the post-strike interval length is the time interval of a typical player's "follow-through" swing after striking the ball.

In all four of the above preferred embodiments, a forceplate to measure quantities related to the two-dimensional position of the player's center of gravity can be replaced with a video motion analysis system. In this alternative embodiment of the above four embodiments, a video motion analysis system measures quantities related to the positions of the players individual body segments during performance of the ball-strike activity. The computer accepts the body segment position signals from the video motion analysis system and, based on knowledge of the masses and center of gravity positions of each of the player's body segments, calculates additional quantities related to the player's center of gravity.

The video motion analysis method for measuring quantities related to the position of the player's center of gravity, although more expensive and complex than the forceplate method, has several advantages. first, quantities related to the position of the player's center of gravity can be readily determined in three dimensions (left-right, front-back, up-down), rather than the two (left-right, forward-backward) provided by the forceplate. Second, the position of the player at the time of ball-strike can be anywhere within the field of view of the video cameras, rather than restricted to positions on the forceplate. These added features are particularly advantageous when embodiments of the invention are to be used for running sport activates as soccer or football kicks, during which the player can be moving over ground rather than standing in a fixed position.

The ball-strike sensor need not be implemented merely as a separate optical, acoustic, mechanical or other device. The sensor may also be implemented heuristically by calculation from other available data. For example, when a video motion analyzer is used to provide the body movement sensor, ball strike can be determined from the motion video by inspection or by image processing, and an appropriate output can be generated to indicate the timing of ball-strike in relation to body movement. If image processing is used, the process may be implemented in the computer or in a separate microprocessor or other digital or analog computing device

DETAILED DESCRIPTION OF SPECIFIC EMBODIMENTS

[A recent patent application by Nashner describes devices and methods for assessment and biofeedback training of foot placement and while subject performs mobility tasks such as sit-to-stand, object avoidance, and stair climbing. The ACT-SET (tm) accessory to the Balancemaster manufactured by NeuroCom International, Inc. is an example of this application.]

Embodiments of the present invention permit the assessment and biofeedback training of an athlete's skills in coordinating the power and accuracy with which a ball is struck to impart to the ball a desired flight trajectory. Coordination of ball-strike to produce a desire ball trajectory is critical to athletic performance during activities such as golf, tennis, baseball batting, soccer, football kicking, and volleyball.

During some activities, the athlete may strike the ball with a ball-striking implement such as a club, racket, or bat. Alternatively, the ball may be struck with a member of the body such as the hand or foot. Furthermore, during some activities, the ball may be placed at rest in the vicinity of the athlete prior to being struck. In other activities, the ball may be struck while in motion on a trajectory passing in the vicinity of the athlete.

To measure quantities related to the center of gravity during a ball-striking activity, the athlete stands on a force sensing surface and performs the ball-strike task. One of three methods are used to sense the time the ball is struck, depending on the specific activity: (1) An impact sensor can be mounted on the handle of the hand-held object during activities in which the athlete uses a hand held object to strike the ball. (2) The ball can be placed on a second impact sensing surface during activities in which the athlete strikes the ball from a position of rest on a surface. (3) A sound sensing device can be placed near the point of contact between the ball-striking implement and the ball during all forms of ball-strike activities. The athlete's performance and the ball-strike time are measured and displayed in relation to a performance goal in order to provide skill assessment and biofeedback information to the athlete.

Figure 1:
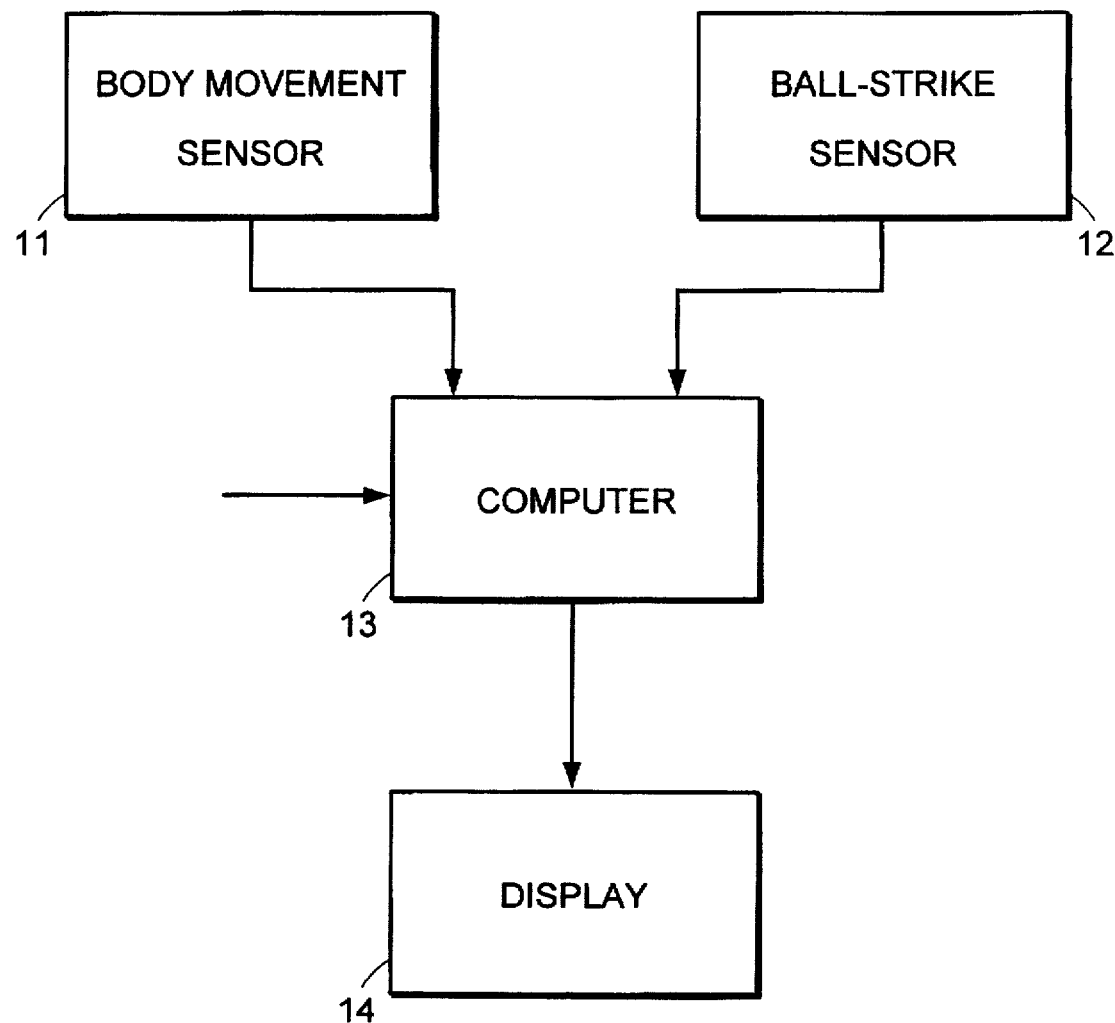
FIG. 1 shows the principle components of a preferred embodiment of the present invention.

FIG. 1 shows the principle components common to all preferred embodiments of the present invention. The athlete stands on a forceplate 11 while performing the ball-strike task. A ball-strike sensor 12 is provided to sense the time of ball-strike during performance of the task. A computer 13 receives signals from the forceplate 11 and ball-strike sensor 12, calculates on a continuous basis quantities related to the two dimensional position of the center of force exerted by the athlete's feet on the forceplate, calculates quantities related to the point in time the ball is first struck, and calculates quantities related to task performance goals. The computer 13 also receives information related to the athlete's height and to the positions of the athlete's feet relative to position marking on the force sensing surface of the forceplate 11. This additional information allows the computer to calculate quantities related to the two-dimensional position of the athlete's center of gravity relative to markings on the forceplate. A display means 14 displays the calculated quantities related to the trajectory of the athlete's center of gravity, the time of ball contact relative to the center of gravity trajectory, and performance goals for the center of gravity trajectory and the time of ball contact.

Figure 2:
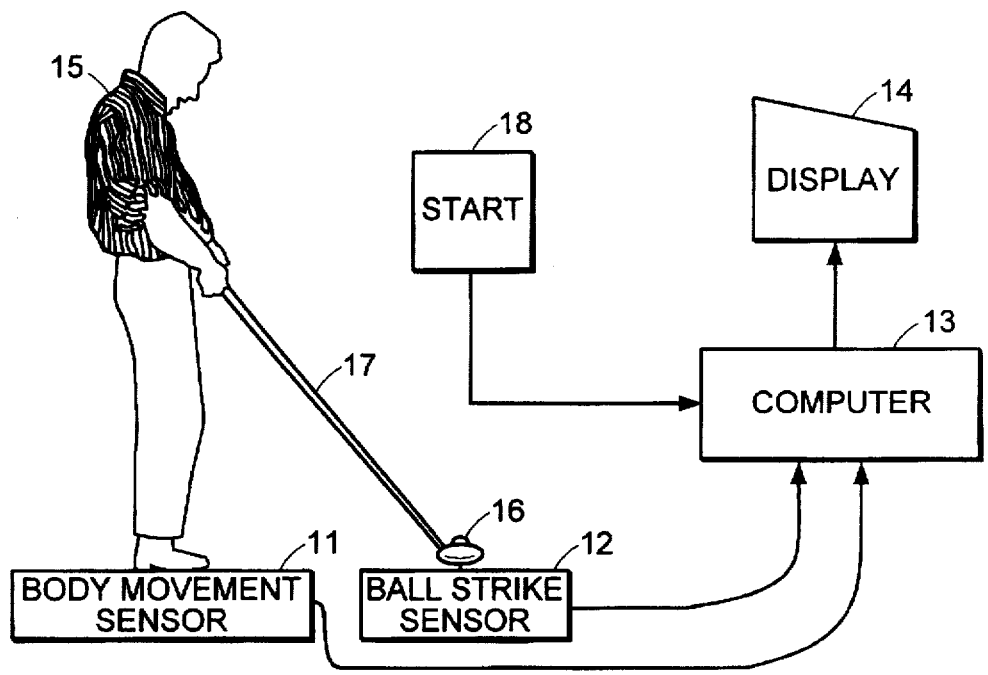
FIG. 2 shows a preferred embodiment of the present biofeedback invention used to assess and train skills control during the golf swing.

One preferred embodiment of the present invention shown in FIG. 2 is intended for assessment and biofeedback training of coordination skills related to accurately controlling the direction and distance of ball flight during the golf swing. The athlete 15 stands on the forceplate 11. The golf ball 16 is placed on the surface of a ball-strike sensor 12. The horizontal and vertical position of the surface of the ball-strike sensor 12 relative to the sensing surface of the forceplate 11 can be adjusted such that the golfer 15 can strike the ball 16 with the golf club 17 while assuming a desired golf stance position. The computer 13 receives signals from the forceplate 11, the ball-strike sensor 12, and the start-time indicating means 18. The computer performs calculations and displays the results on the display means 14.

Figure 3:
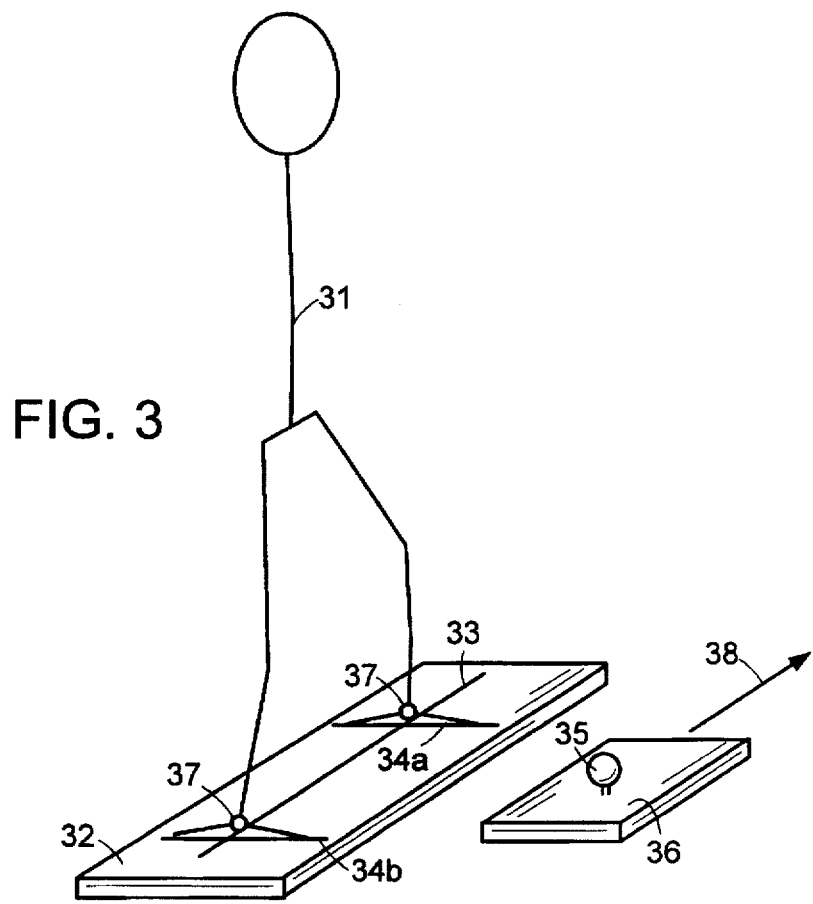
FIG. 3 shows positioning of a golfer on the force sensing surface and positioning of the ball on a second supporting surface in a preferred embodiment of the golf swing assessment and biofeedback training system.

FIG. 3 shows the placement of the golfer's feet 31 on the force sensing surface of the forceplate 32. Preferred front-back positions of the feet are indicated by the longitudinal alignment line 33 which shows the desired positions of the athlete's ankle joints 37 relative to the front and back boundaries of the force sensing surface. Spacing of the feet relative to the boundaries of the forceplate are indicated by positions of the athlete's feet relative to the right lateral alignment line 34a and the left lateral alignment line 34b. The arrow 38 shows the desired direction of ball flight which is parallel to the lateral alignment line 33. To create a condition similar to play on a level surface, the surface of the ball-strike sensor 36 is placed at the same height as the surface of the forceplate 32.

Figure 4:
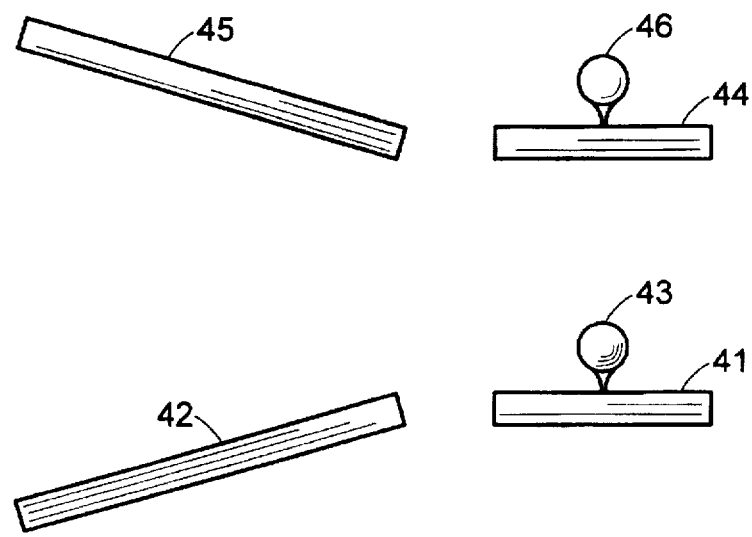
FIG. 4 shows positioning of the ball-strike sensing surface relative to the forceplate to simulate the golf swing on a sloping surface.

FIG. 4 shows placement of the ball-strike sensing surface 41 at a height above that of the forceplate 42, a position simulating playing conditions in which the golfer is playing on a sloping surface with the ball 43 lying above the golfer. Placement of the ball-strike sensing surface 44 below that of the surface of the forceplate 45 simulates playing on a sloping surface with the ball 46 lying below the golfer.

Figure 5:
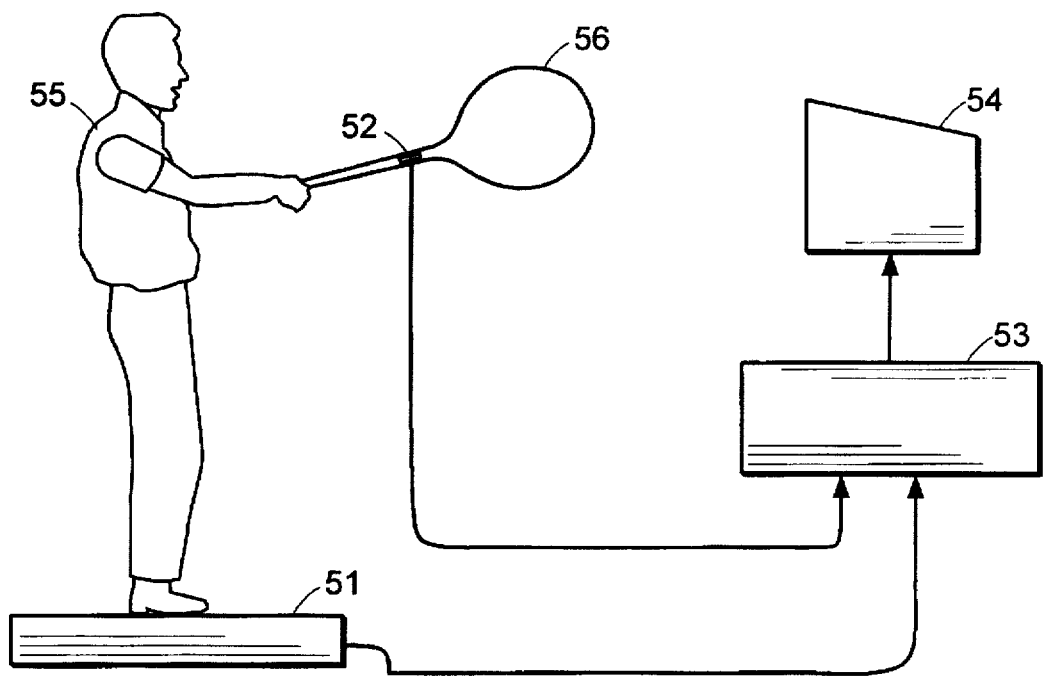
FIG. 5 shows a preferred embodiment of the present biofeedback invention used to assess and train skills during the tennis swing.

A second preferred embodiment of the present invention shown in FIG. 5 is intended for assessment and biofeedback training of coordination skills related to accurately controlling the direction and distance of ball flight during the tennis swing. The athlete 55 stands on the forceplate 51. The feet are positioned on the sensing surface using methods similar to those described in FIG. 3. The athlete holds the tennis racket 56, on which is mounted a ball-strike sensor 52. The computer 53 receives signals from the forceplate 51 and the ball-strike sensor 52. The computer performs calculations and displays the results on the display means 54. Methods for establishing the placement of the tennis player's feet on the force sensing surface relative to longitudinal and lateral alignment lines are similar to those described for the golf biofeedback system in FIG. 3. With this preferred embodiment of the present invention, the tennis player is free to swing at an in-flight ball whose trajectory passes within the player's area of reach.

An alternative preferred embodiment substantially similar to that shown in FIG. 5 is intended for assessment and biofeedback training of coordination skills related to accurately controlling the direction and distance of ball flight during the baseball bat swing. In the embodiment intended for training the swing of the baseball bat, the tennis racket is replaced by a baseball bat on which is mounted a ball-strike sensor.

Figure 6:
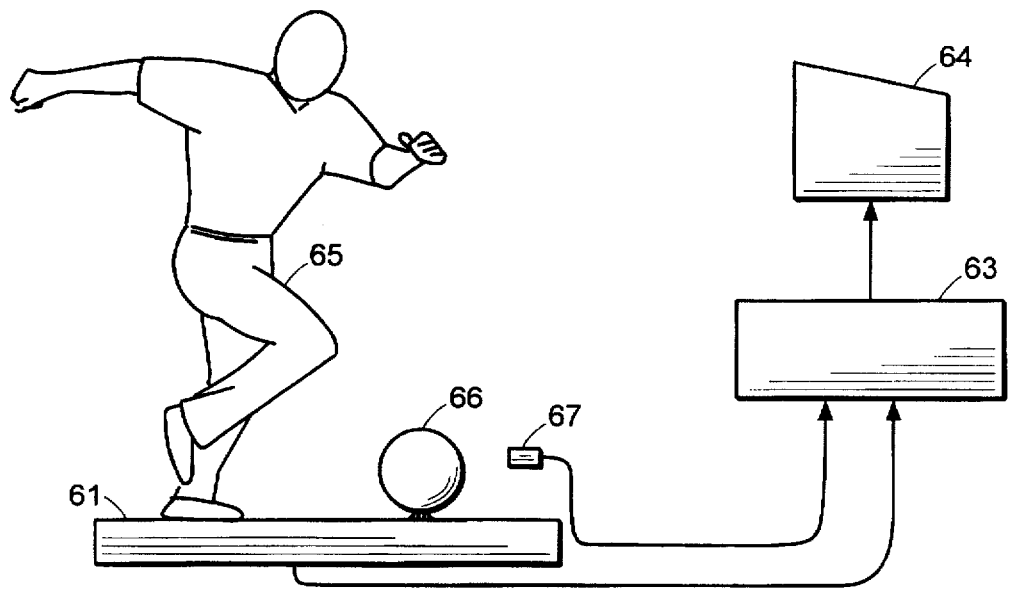
FIG. 6 shows a preferred embodiment of the present biofeedback invention used to assess and train skills during the in-place ball kick.

A third preferred embodiment of the present invention shown in FIG. 6 is intended for assessment and biofeedback training of coordination skills related to accurately controlling the direction and distance of ball flight during the ball-kick. The athlete 65 stands on the forceplate 61. The feet are positioned on the sensing surface using methods similar to those described in FIG. 3. The ball 66 is placed on the force sensing surface such that the athlete can kick the ball and complete the follow through while remaining on the force sensing surface. An acoustic ball-strike sensor 67 is positioned near the soccer ball to receive sound vibration signals associated with the foot impacting the soccer ball. The computer 63 receives signals from the forceplate 61 and the ball-strike sensor 67. The computer performs calculations and displays the results on the display means 64. Methods for establishing the placement of the kicker's feet on the force sensing surface relative to longitudinal and lateral alignment lines are similar to those described for the golf biofeedback system in FIG. 3.

Figure 7:
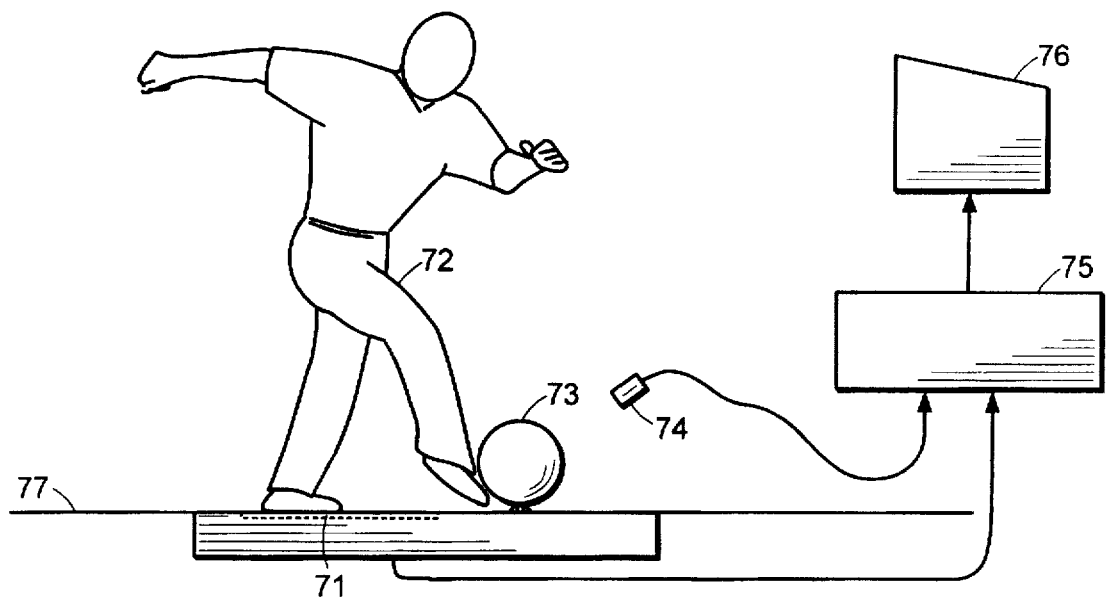
FIG. 7 shows a preferred embodiment of the present biofeedback invention used to assess and train skills during the running ball kick.

A fourth preferred embodiment of the present invention shown in FIG. 7 is intended for assessment and biofeedback training of coordination skills related to accurately controlling the direction and distance of ball flight during the running ball-kick. The athlete 72 runs over a large running surface area 77 and kicks a ball 73. A forceplate 71 is imbedded in the running surface 77 with the ball 73 is placed on the running surface sufficiently close to the force sensing surface 71 such that the athlete will be on the force sensing surface when the ball is kicked. An acoustic ball-strike sensor 74 is positioned near the ball to receive sound vibration signals associated with the foot impacting the ball. The computer 75 receives signals from the forceplate 71 and the ball-strike sensor 74. The computer monitors signals from the forceplate and initiates calculations at the trial start-time indicated by the first detection of force attributable to the athlete's foot contacting the force sensing surface. Results are displayed on the display means 76 from the trial start-time and continuing a fixed interval of time following ball-strike time, as indicated by signals from the ball-strike sensor 74. Methods for establishing the placement of the kicker's feet on the force sensing surface relative to longitudinal and lateral alignment lines are similar to those described for the golf biofeedback system in FIG. 3.

Figure 8:
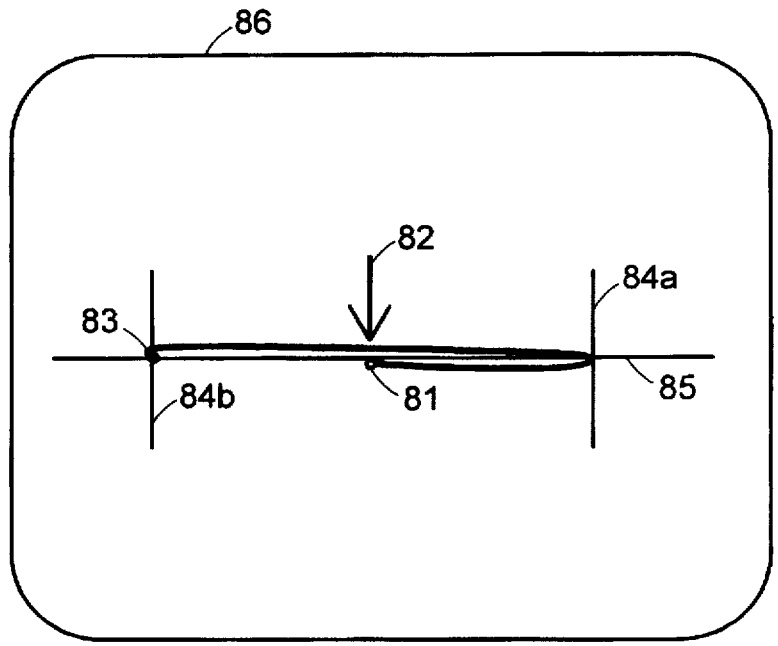
FIG. 8 shows the biofeedback display characteristic of a well coordinated golf swing in accordance with a preferred embodiment of the golf swing assessment and biofeedback training system.

FIG. 8 shows one preferred embodiment of a biofeedback display which can be used in conjunction with the preferred embodiment of the golf swing biofeedback assessment and training system shown in FIG. 2. Movements of the golfer's center of gravity during the golf swing are shown on a two-dimensional display 86. The lateral dimension of the display shows the center of gravity motions relative to the golfer's left-right axis. Up-down dimension of the display shows the center of gravity motions relative to the golfer's forward-backward axis. The sagittal alignment reference 85 corresponds to the longitudinal alignment line 33 shown in FIG. 3. The right 84a and left 84b lateral alignment references correspond to the right and left lateral alignment lines 34a and 34b shown in FIG. 3. During a well-coordinated golf swing, the direction of ball flight should approximately correspond to the sagittal alignment reference 85. The center of gravity trajectory begins at the indicated start-time of the trial 81 and continues until the designated trail stop-time 83. A marker arrow 82 shows the point on the center of gravity trajectory at which the ball-strike occurs.

The biofeedback display shown in FIG. 8 is indicative of a well-coordinated golf swing. The subject begins the swing with the center of gravity 81 centered relative to the sagittal 85 and lateral 84a and 84b references. During the back swing, the center of gravity moves the full distance to the right lateral reference 84a. During the down strike, the center of gravity moves leftward and strikes the ball 82 at the center position relative to the sagittal and lateral references. Finally, during the follow-up swing, the center of gravity moves left the full distance to the left lateral reference 84b. By avoiding center of gravity movements ahead of or behind the sagittal reference 85, the golfer moves the body center of gravity in a straight line aligned with the desired direction of ball-flight. By moving the center of gravity the full distance between the right and left lateral references and by striking the ball while centered between the lateral references 84a and 84b, the player is transferring the maximum forward momentum to the ball.

Figure 9:
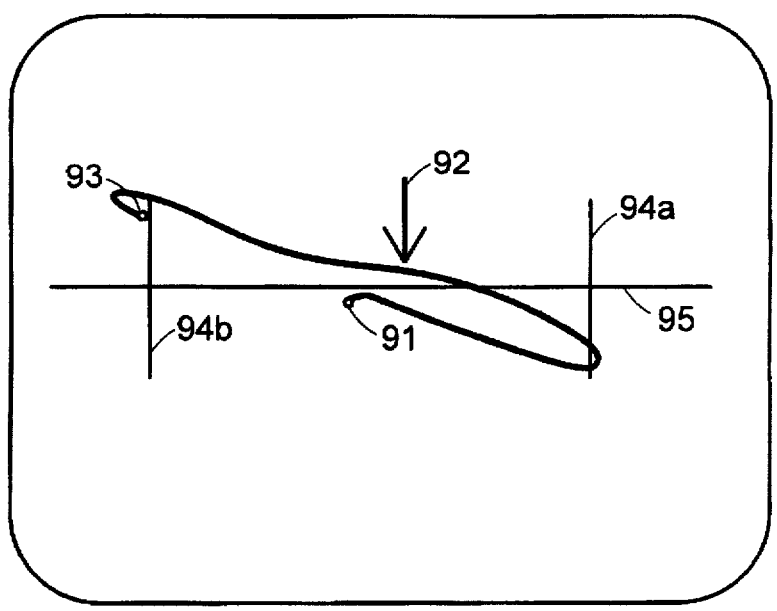
FIG. 9 shows the biofeedback display characteristic of a poorly coordinated golf swing in accordance with a preferred embodiment of the golf swing assessment and biofeedback training system.

The biofeedback display shown in FIG. 9 uses the same format as the FIG. 8 display and is indicative of one form of poorly coordinated golf swing. The subject's center of gravity is centered at the beginning of the swing 91 relative to the sagittal 95 and lateral 94a and 94b references. During the back swing, however, the center of gravity moves backward relative to the sagittal reference 95. Then, as the center of gravity moves to the left during the down swing, the golfer hits the ball 92 before the center of gravity is centered between the lateral markings 94a and 94b. Finally, at the completion of the follow-up swing 93 the golfer has shifted the center of gravity forward relative to the sagittal reference 95. By not aligning the center of gravity movement with the sagittal reference 95, the movement of the body golfer's center of gravity is not aligned with the desired direction of ball flight. By striking the ball 92 before the body center of gravity is centered between the lateral references 94a and 94b, the golfer is not imparting the maximum forward momentum to the ball.

Figure 10:
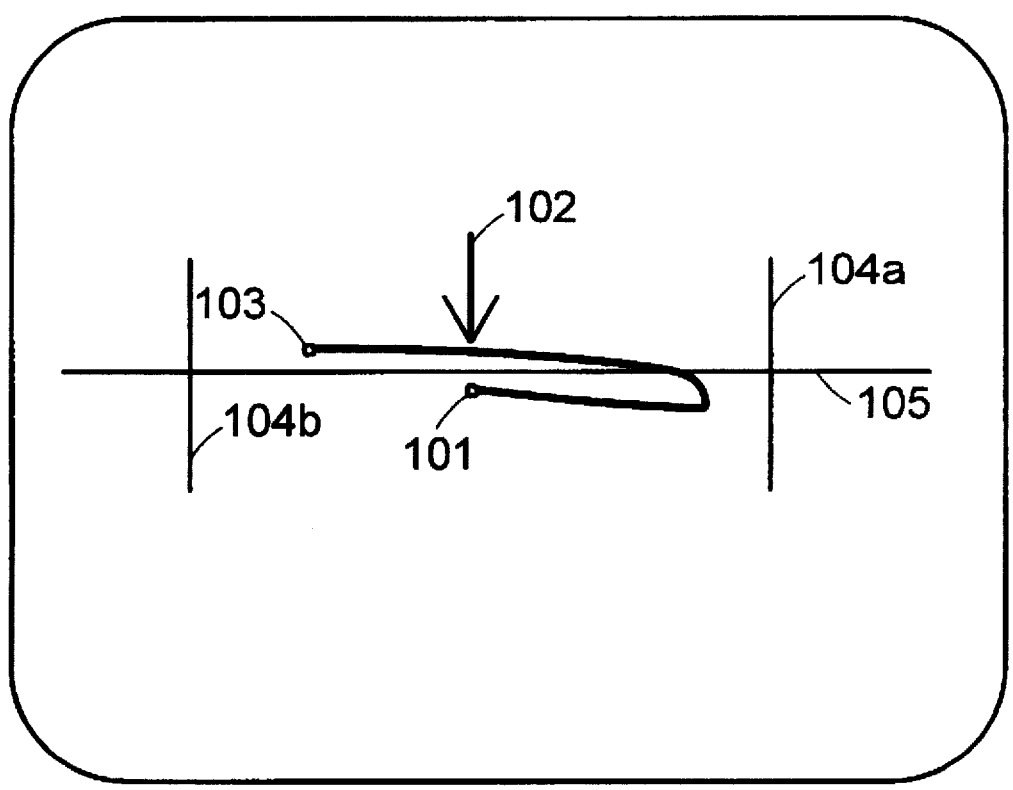
FIG. 10 shows the biofeedback display characteristic of a restricted golf swing in accordance with a preferred embodiment of the golf swing assessment and biofeedback training system.

The biofeedback display shown in FIG. 10 uses the same format as FIG. 8 and is indicative of a second form of poorly coordinated golf swing. At the beginning of the golf swing the golfer's center of gravity 101 is centered relative to the sagittal reference 105 and the right 104a and left 104b lateral references. During the back swing, however, the golfer fails to move the center of gravity the full distance to the right lateral reference 104a. Finally, at the completion of the follow-up swing 103 the golfer fails to shift the center of gravity the full distance to the left lateral reference 104b. By not moving the center of gravity the full distance between the lateral references 104a and 104b, the golfer is not imparting the maximum forward momentum to the ball.

Figure 11:
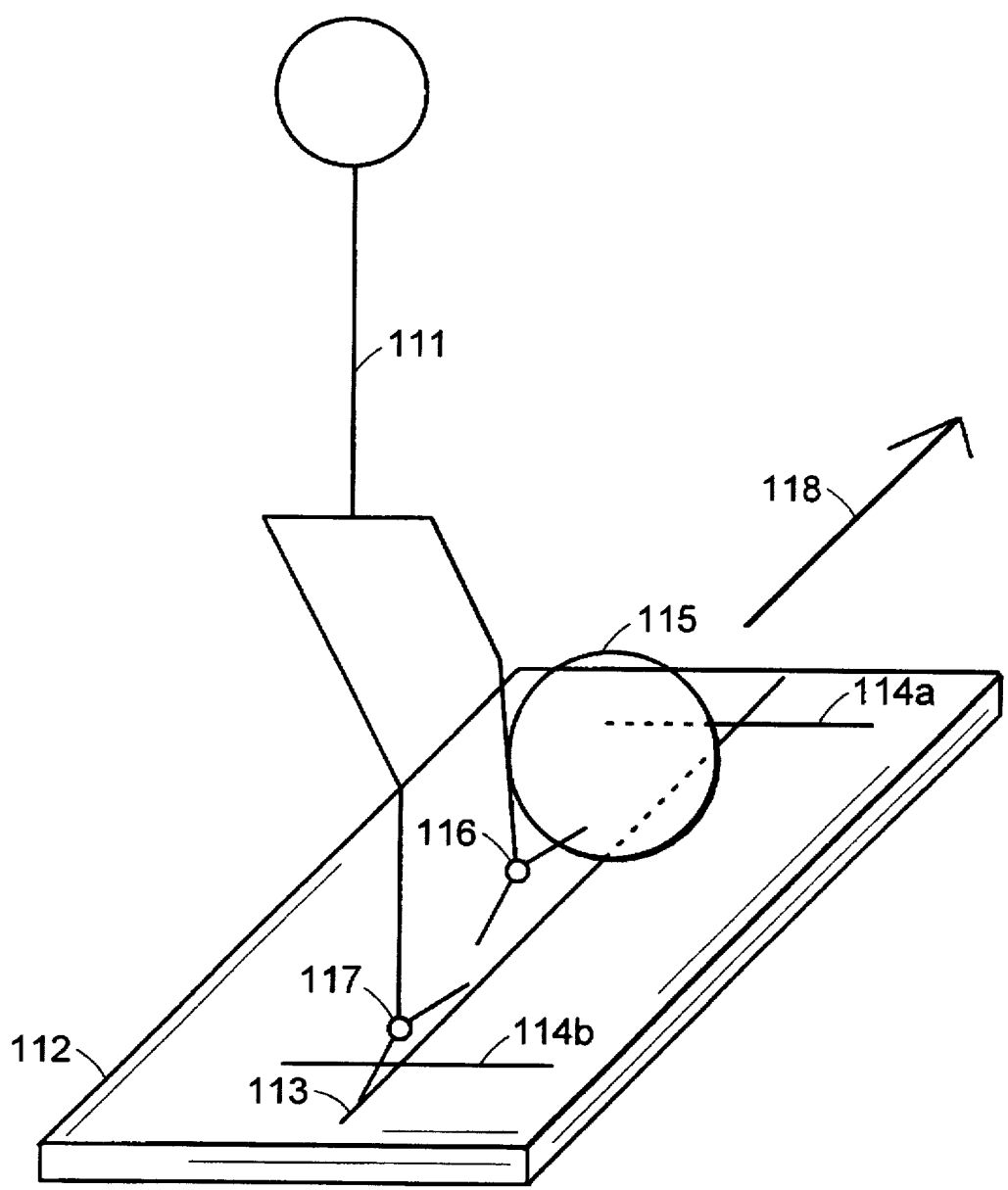
FIG. 11 shows positioning of a kicker and a ball on the force sensing surface in a preferred embodiment of the ball kick assessment and biofeedback training system.

FIG. 11 shows the placement of a kicker 111 on the force sensing surface of the forceplate 112 in accordance with the preferred embodiment of the Ball-Kick Biofeedback Training System shown in FIG. 6. Preferred lateral positions of the feet are indicated by the lateral alignment line 113 which shows the desired positions of the athlete's ankle joints 116 and 117 relative to the left and right boundaries of the force sensing surface. Front-back spacing of the kicker's feet relative to the boundaries of the forceplate are indicated by positions of the athlete's feet relative to the front longitudinal alignment line 114a and the back longitudinal alignment line 114b. The arrow 118 shows the desired direction of ball flight which is parallel to the lateral alignment line 113. To allow the kick from the beginning of kick leg 116 swing to the follow through to be completed on the force sensing surface, the ball 115 is placed along the lateral alignment line half way between the back 114b and front 114a longitudinal alignment lines.

Figure 12:
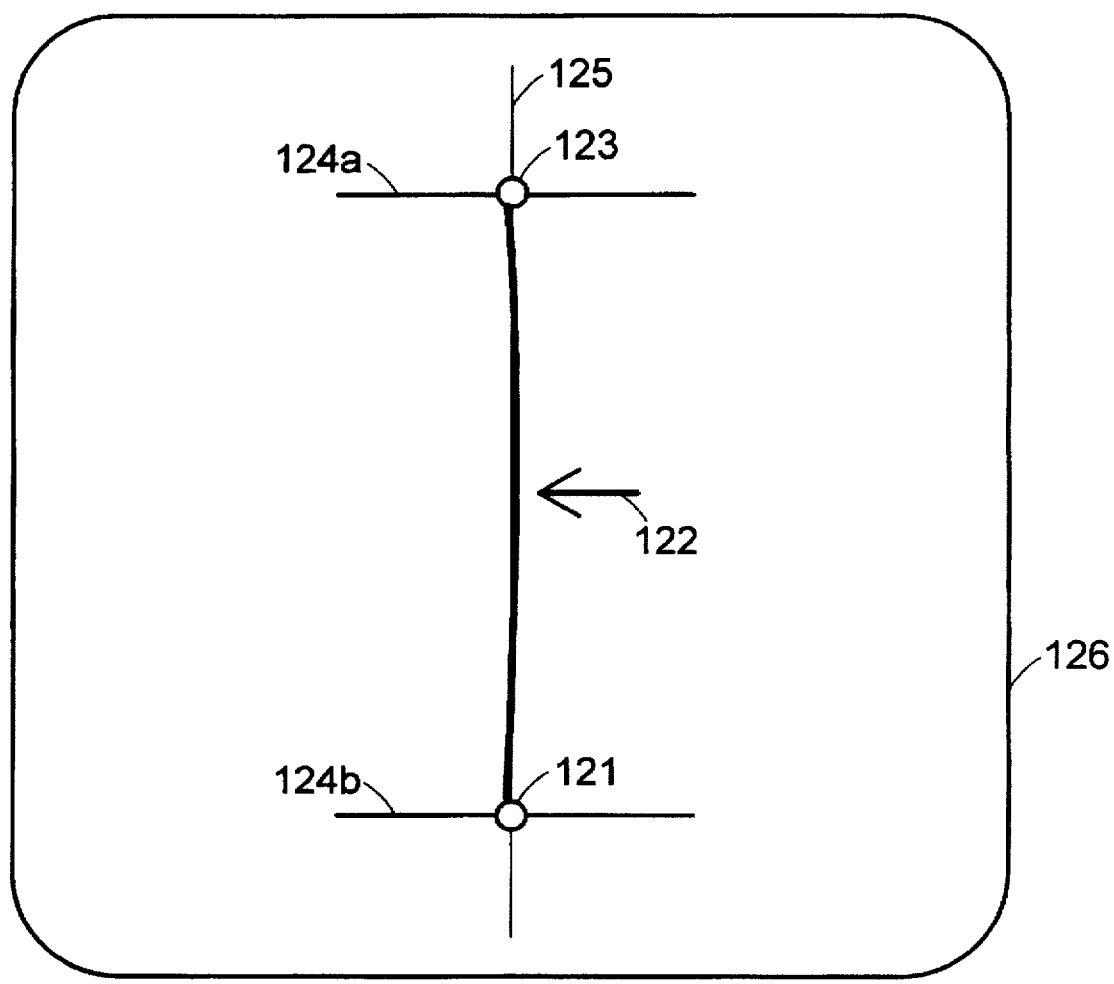
FIG. 12 shows the biofeedback display characteristic of a well coordinated ball kick in accordance with a preferred embodiment of the ball kick assessment and biofeedback training system.

FIG. 12 shows a preferred embodiment of the biofeedback display which can be used in conjunction with the preferred embodiment for assessment and biofeedback training of the ball-kick shown in FIG. 6. Movements of the kicker's center of gravity are shown on a two-dimensional display 126. The lateral dimension of the display shows the center of gravity motions relative to the kicker's left-right axis. Up-down dimension of the display shows the center of gravity motions relative to the kicker's forward-backward axis. The front 124a and back 124b longitudinal references correspond to the front and back longitudinal alignment lines 114a and 114b shown in FIG. 11. The lateral reference 125 corresponds to the lateral alignment line 113 shown in FIG. 11. During a well-coordinated in-place kick, the direction of ball flight should be approximately aligned with the lateral reference 125. The center of gravity trajectory begins at the indicated start-time of the trial 121 and continues until the designated trail stop-time 123. A marker arrow 122 shows the point in the center of gravity trajectory at which the ball-strike occurred.

The biofeedback display shown in FIG. 11 is indicative of a coordinated in-place ball kick. The subject begins the kick with the center of gravity 111 on the lateral reference and over the back sagittal reference 114b. During the kick, the center of gravity moves along the lateral reference 115 and travels the full distance to the front sagittal reference 114a during the follow through. Furthermore, the time of ball struck 112 occurs when the center of gravity of mid-way between the front and back sagittal references 114a and 114b. By avoiding center of gravity movements to the left and right of the lateral reference 115, the kicker moves the body center of gravity in a straight line aligned with the desired direction of ball-flight. By moving the center of gravity over the full distance between the front and back longitudinal references 114a and 114b and by striking the ball at the center position relative to these longitudinal references, the player is transferring the maximum forward momentum to the ball.

It should be understood by a practitioner knowledgeable in the art of sports training that configurations other than the preferred embodiments described in FIGS. 1 through 12 may be employed for placing the athlete in a ball-strike position on a force sensing surface relative to alignment markings on the surface, having the athlete perform the ball-strike task, measuring the time of ball contact using a contact status sensor, and displaying quantities related to the forces exerted by the athlete on the force sensing surface and related to the time of ball contact. For example, during the football or soccer kick it is sometimes desirable that the direction of ball flight is "off-axis" and not aligned with the direction of the kicker's movement. Assessment and training of "off-axis" kicks would require the setting of different goals for center of gravity motions and ball impact times.

The computer may be a general purpose PC or other digital computer that has been appropriately programmed, or it may be realized as a hard-wired controller or a hybrid controller utilizing a CPU that has been programmed with instructions maintained in ROM. Alternatively, the computer may be an analog computer.

What is claimed is:

1. A device for the assessment or biofeedback training of coordination skills of a subject critical to maximizing the power and accuracy of athletic ball-strike activities, such device comprising:

a body movement sensor, providing an output indicative of the motion of the subject's center of gravity over a period of time including the moment of ball strike;

a ball-strike sensor;

a display; and a computer, in communication with the body movement sensor, the ball strike sensor, and the display, to cause the display to show both a trajectory of the subject's center of gravity, and the moment of ball strike in relation to a region of the trajectory.

2. A device according to claim 1, wherein the body movement sensor output includes motion data in at least two dimensions and the computer causes the display to show the trajectory in at least two dimensions.

3. A device according to claim 2, wherein the body movement sensor includes a forceplate.

4. A device according to claim 2, wherein the display and the computer are configured to operate in real time.

5. A device according to claim 1, wherein the computer further includes means for outputting a display signal so as to cause the display to show thereupon the trajectory and moment of ball strike relative to a performance goal, so that coordination skills of the subject may be visually compared against the performance goal.

6. A device according to claim 1, wherein the body movement sensor includes a single forceplate which supports the subject's entire weight.

7. A device for the assessment or biofeedback training of coordination skills of a subject in connection with a movement task, such task including the use of a striking object and an object to be struck, the success of which is dependent upon the subject's motion at a critical phase of the task, such device comprising:

a body movement sensor, providing a first output indicative of the motion of the subject's center of gravity over a period of time including the one of the critical phase;

a contact-status sensor, providing a second output indicative of the state of contact between the striking object and the object to be struck;

signal means for providing a signal at onset of the critical phase;

a display; and a computer, in communication with the body movement sensor, the contact-status sensor, the signal means, and the display, to cause the display to show both a trajectory of the subject's center of gravity, and the onset of the critical phase in relation to a region of the trajectory.

8. A device according to claim 7, wherein the body movement sensor output includes motion data in at least two dimensions and the computer causes the display to show the trajectory in at least two dimensions.

9. A device according to claim 8, wherein the computer further includes means for outputting a display signal so as to cause the display to show thereupon the trajectory and onset of the critical phase relative to a performance goal, so that coordination skills of the subject may be visually compared against the performance goal.

10. A device according to claim 7, wherein the body movement sensor includes a single forceplate which supports the subject's entire weight.

11. A method for the assessment or biofeedback training of coordination skills of a subject critical to maximizing the power and accuracy of an athletic ball-strike activity, the method comprising:

(a) tracking the movement of the subject's center of gravity and providing a movement output signal indicative of the motion of the subject's center of gravity over a period of time including the moment of ball strike;

(b) waiting for ball-strike and providing, upon ball-strike, an output signal indicative of the ball-strike; and (c) calculating and outputting a display signal, on the basis of the movement output signal and the ball-strike output signal, so as to cause a display to show both a trajectory of the subject's center of gravity, and the moment of ball strike in relation to a region of the trajectory.

12. A method according to claim 11, wherein step (c) includes the step of calculating and causing the display to show thereupon the trajectory and moment of ball strike relative to a performance goal, so that coordination skills of the subject may be visually compared against the performance goal.

13. A method for the assessment or biofeedback training of coordination skills of a subject critical to maximizing the power and accuracy of an athletic ball-strike activity, the method comprising:

(a) tracking the movement of the subject's center of gravity and providing a movement output signal indicative of the motion of the subject's center of gravity over a period of time including the moment of ball strike;

(b) waiting for ball-strike and providing a ball-strike output signal indicative of ball-strike;

(c) calculating and outputting a display signal so as to cause a display to show, on the basis of the movement output signal and the ball-strike output signal, both a trajectory of the subject's center of gravity, and the moment of ball strike in relation to a region of the trajectory; and;

wherein the step of providing the movement output signal includes providing motion data in at least two dimensions and step (c) includes the step of calculating and outputting a display signal so as to cause the display to show the trajectory in at least two dimensions.

14. A method for the assessment or biofeedback training of coordination skills of a subject in connection with a movement task, such task including the use of a striking object and an object to be struck, the success of which is dependent upon the subject's motion at a critical phase of the task, the method comprising:

(a) tracking the movement of the subject's center of gravity and providing a movement output signal indicative of the motion of the subject's center of gravity over a period of time including the onset of the critical phase;

(b) determining onset of the critical phase;

(c) calculating and outputting a display signal, on the basis of the movement output signal and the results of step (b), so as to cause a display to show both a trajectory of the motion of the subject's center of gravity and the onset of the critical phase in relation to a region of the trajectory; and (d) determining a state of contact between the striking object and the object to be struck.

15. A method according to claim 14, wherein the step of providing the movement output includes providing motion data in at least two dimensions and step (c) includes the step of calculating and causing the display to show the trajectory in at least two dimensions.

16. A method according to claim 14, wherein step (c) includes the step of calculating and causing the display to show thereupon the trajectory and onset of the critical phase relative to a performance goal, so that actual performance may be visually compared against the performance goal.

17. A method according to claim 14, wherein steps (a) through (c) are carried out in real time.

18. A method according to claim 14, wherein the step of tracking the movement of the subject's center of gravity includes the step of having the subject stand on a single forceplate which supports the subject's entire weight.

19. A method for the assessment or biofeedback training of coordination skills of a subject critical to maximizing the power and accuracy of an athletic ball-strike activity, the method comprising:

(a) tracking the movement of the subject's center of gravity and providing a movement output signal indicative of the motion of the subject's center of gravity over a period of time including the moment of ball strike;

(b) waiting for ball-strike and providing a ball-strike output signal indicative of ball-strike;

(c) calculating and outputting a display signal so as to cause a display to show, on the basis of the movement output signal and the ball-strike output signal, both a trajectory of the subject's center of gravity, and the moment of ball strike in relation to a region of the trajectory; and;

wherein the step of tracking the movement of the subject's center of gravity body includes the step of having the subject stand on a single forceplate which supports the subject's entire weight.

* * * * *